United States Patent
Isono (10) Patent No.: US 9,792,461 B2
(45) Date of Patent: Oct. 17, 2017

(54) CONTROL APPARATUS

(71) Applicant: NLT Technologies, Ltd., Kanagawa (JP)

(72) Inventor: Katsuji Isono, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 196 days.

(21) Appl. No.: 14/689,381

(22) Filed: Apr. 17, 2015

(65) Prior Publication Data

US 2015/0302209 A1 Oct. 22, 2015

(30) Foreign Application Priority Data

Apr. 19, 2014 (JP) .................................. 2014-086936

(51) Int. Cl.
- *H04L 9/00* (2006.01)
- *G06F 21/76* (2013.01)
- *G06F 21/75* (2013.01)

(52) U.S. Cl.
CPC .............. *G06F 21/76* (2013.01); *G06F 21/75* (2013.01)

(58) Field of Classification Search
CPC .......... G06F 21/71; G06F 21/72; G06F 21/75; G06F 21/76; G06F 21/78; G06F 21/86; G06F 21/87; G06F 3/062
USPC ...... 726/26–31; 713/174, 193–194; 711/100, 711/102–103
See application file for complete search history.

(56) References Cited

U.S. PATENT DOCUMENTS

| | | | |
|---|---|---|---|
| 6,356,135 B1* | 3/2002 | Rastegar | H03B 5/08 327/337 |
| 6,433,658 B1* | 8/2002 | Rastegar | H03B 5/08 327/337 |
| 7,289,381 B1* | 10/2007 | Voo | H03F 3/45183 365/205 |
| 8,073,996 B2* | 12/2011 | Cardoso | G01R 31/31719 710/62 |
| 8,230,375 B2* | 7/2012 | Madurawe | G06F 17/5068 716/117 |
| 8,610,443 B1* | 12/2013 | Ryshtun | G06F 3/03545 324/658 |

(Continued)

FOREIGN PATENT DOCUMENTS

| | | |
|---|---|---|
| JP | 2004-326143 | 11/2004 |
| JP | 2006-163522 | 6/2006 |
| JP | 2009-110077 | 5/2009 |

OTHER PUBLICATIONS

Altera Corporaiton: Cyclone IV Device Handbook, vol. 1, Apr. 2014.

(Continued)

*Primary Examiner* — Hosuk Song
(74) *Attorney, Agent, or Firm* — Young & Thompson (57) ABSTRACT

PROBLEM
Unauthorized reproduction by a third party is to be prohibited by preventing waveform monitoring on a circuit board and by providing security from the viewpoint of hardware.
SOLUTION
The present invention disables waveform observation by providing a capacitance detection circuit 3 between devices (i.e., between a programmable device 1 and a nonvolatile device 2) so as to detect input capacitance of the waveform observation apparatus and to halt data signals themselves between the devices (i.e., between the programmable device 1 and nonvolatile device 2).

8 Claims, 9 Drawing Sheets

(56) References Cited

U.S. PATENT DOCUMENTS 8,779,783 B1 * 7/2014 Liepold .................. G06F 3/016
 324/658

OTHER PUBLICATIONS

Xilinx, Inc.: Spartan-6 FPGA Configuration Guide UG380 (V2.7) Oct. 29, 2014.

* cited by examiner

CONTROL APPARATUS

TECHNICAL FIELD

The present invention relates to control apparatuses, and in particular to a control apparatus that prevents unauthorized reproduction and information leaks to enhance security of circuit data for a programmable device by preventing waveform observation performed between devices.

BACKGROUND ART

A programmable device having the ability to reconfigure a logic circuit is exposed to risks of, due to its reconfigurable nature, unauthorized reproduction of the device with ease or of leaks of technical information through data analyses in the event that the logic circuit data is read out to a third party. To prevent such risks, some methods for protecting logic circuit data are known, such as encrypting logic circuit data to disable recovery of the circuit, or assigning an ID code to prohibit reading data unless a matching ID code is given.

These methods, which are based on software operations, exert effects on the data itself that is input to the device, and thus provide a very high level of security against third party activities such as an unauthorized attempt to restore data or to read and analyze data.

On the other hand, considering from the viewpoint of hardware, in many devices there are few programmable logic devices that operate by themselves. For example, a field-programmable gate array (FPGA) has a nonvolatile device that can externally store data, and at the time of initial operation, the data stored in the nonvolatile device is loaded so that circuit data is written into the FPGA. In this case, a signal line is inevitably needed between the FPGA and nonvolatile device on the circuit board because the circuit data that is encrypted or assigned an ID code as described above is stored in the external nonvolatile device as configuration data. Such FPGA poses a risk of revealing what the circuit data is like in the event that the signal line on the circuit board is monitored for waveforms with an oscilloscope or the like. Or, even if the exact circuit data cannot be restored, generating the same waveforms makes it sufficiently possible to produce a device functioning as an FPGA, and thus there still remains a risk of unauthorized reproduction by a third party.

Some methods have been proposed for preventing copying of information about FPGA circuits. For example, Patent Document 1 proposes a method for determining whether to transfer circuit configuration data into an FPGA by controlling transfer of the circuit configuration data into the FPGA.

Patent Document 2 proposes a method for downloading circuit layout data for another module using a communication interface which is constructed with a small amount of FPGA circuit layout data at startup of the device, as well as a method for having no such circuit layout data left in a memory device that can be accessed from outside.

Patent Document 3 proposes a method for destroying any programmable device such as a programmable logic device (PLD) and FPGA as well as any nonvolatile device such as flash memory in case unauthorized access is detected, that is, a method for protecting data in these devices from being read out from outside.

PRIOR ART REFERENCES

Patent Documents

Patent Document 1: Japanese Laid-Open Publication No. 2006-163522

Patent Document 2: Japanese Laid-Open Publication No. 2004-326143

Patent Document 3: Japanese Laid-Open Publication No. 2009-110077

NON-PATENT DOCUMENTS

Non-Patent Document 1: Document provided by Altera Corporation: Cyclone IV Device Handbook, Volume 1
Non-Patent Document 2: Document provided by Xilinx, Inc.: Spartan-6 FPGA Configuration Guide UG380

SUMMARY OF THE INVENTION

Problems to be Solved by the Invention

Figure 1:
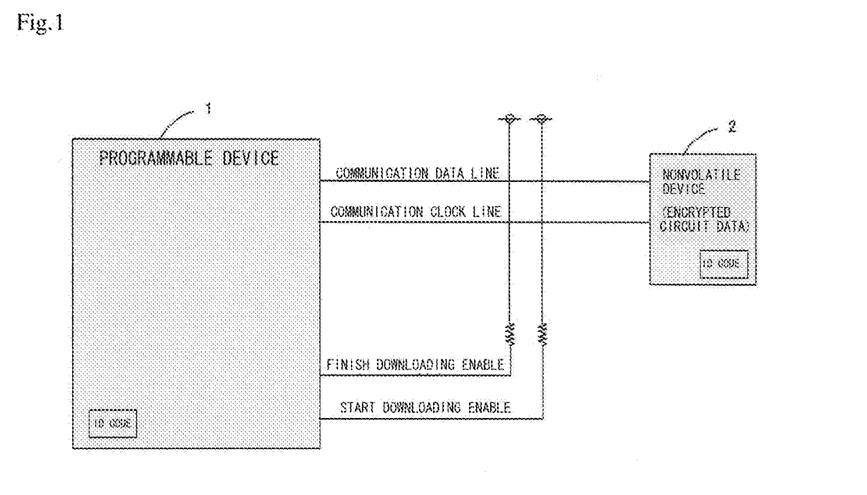
FIG. 1 illustrates a configuration according to a conventional art.
Figure 2:
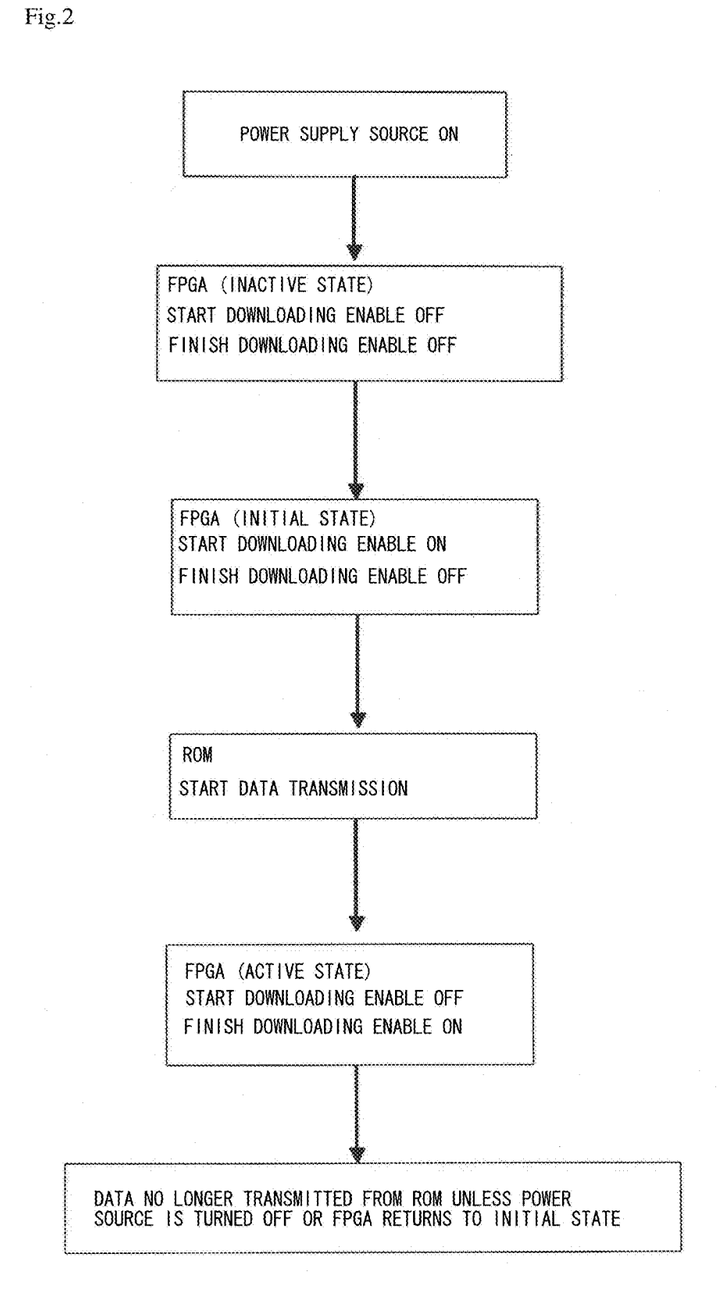
FIG. 2 illustrates a flowchart according to a conventional art.

FIG. 1 is a block diagram generally illustrating an overall conventional apparatus. FIG. 2 illustrates a flowchart for a conventional apparatus.

The above conventional art represents a general method, while Patent Documents 1 and 2 contain representative wiring information which is disclosed on the Web.

With regard to such devices as a programmable device 1, which requires circuit data to be stored in an external nonvolatile device 2, to protect the circuit data or to prevent unauthorized reproduction into a device having the same functions, security has to be provided at least from the viewpoint of software and from the viewpoint of hardware. For example, encrypting and configuring the circuit data based on software prevent leaks of technical information even when the circuit data is read out because the circuit cannot be restored as far as the decoding key is unknown. Similarly, assigning an ID code can prevent leaks of technical information and unauthorized reproduction because the circuit cannot be read out as far as the ID code is unknown.

However, on hardware, if waveforms of signals are observed between devices (i.e., between the programmable device 1 and nonvolatile device 2), the data including information about any specified encryption or ID code will be acquired because the waveforms represent the circuit data itself. Although it is not easy to decode data from waveforms, there exists a risk of reproduction into a device having the same functions because it is easy to generate the same waveforms.

As hardware-based solutions to these problems, Patent Documents 1 and 2, for example, disclose techniques to improve security.

However, both involve connection between a programmable device and another device, being exposed to a risk of unauthorized reproduction with ease in the even that waveforms are acquired from the connection line.

An object of the present invention is to prevent unauthorized reproduction and information leaks to enhance security of circuit data for a programmable device by preventing waveform observation performed between devices.

Means for Solving the Problems

The present invention, being provided from the viewpoint of hardware, disables waveform observation to improve security by disposing a capacitance detection circuit between devices (i.e., between a programmable device and a nonvolatile device) so as to detect input capacitance of a waveform observation apparatus and to halt a data signal itself between the devices (i.e., between the programmable device and the nonvolatile device).

MODE FOR CARRYING OUT THE INVENTION

EXAMPLES

Example 1

Figure 4:
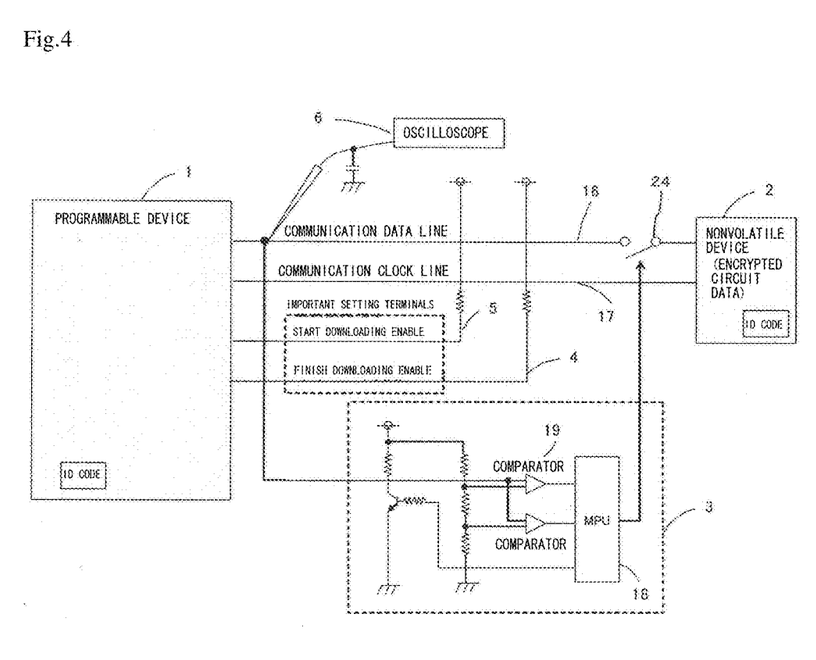
FIG. 4 illustrates a detailed configuration of the control apparatus where a capacitance detection circuit is connected, according to the first example of the present invention.

FIG. 4 is a block diagram illustrating an overall control apparatus according to the first example of the present invention. A configuration according to the present invention will now be described below.

A configuration according to the present invention includes: a programmable device 1 where circuitry within the IC can be freely rewritten into any circuit; a nonvolatile device 2 which holds data for configuring the circuit; a capacitance detection circuit 3 which detects a change in capacitance of the wiring that connects the programmable device 1 to the nonvolatile device 2 with a communication clock line 17 and a communication data line 16; and a circuit which can generate a signal being capable of interrupting the wiring for either the communication data line 16 or the communication clock line 17.

A circuit is mounted on a printed circuit board where the programmable device 1 and the nonvolatile device 2 are connected to each other with the communication clock line 17 and communication data line 16, and the capacitance detection circuit 3 for detecting wiring capacitance is connected to the communication data line 16. Start Downloading Enable 4 and Finish Downloading Enable 5, which are connected to the programmable device 1, represent signals indicating operations inside the programmable device 1 and represent important setting terminals for downloading data (Start Downloading Enable 4 and Finish Downloading Enable 5 are hereinafter collectively called important setting terminals). The capacitance detection circuit 3 is not used for detecting any specific numeric value, but operates only when there is a change in capacitance of the communication data line 16 due to waveform observation performed by a waveform observation apparatus, such as an oscilloscope 6. When a change in capacitance of the communication data line 16 is detected, a switch 24 or the like interrupts the connection established by the communication data line 16 to stop communications. Alternatively, the capacitance detection circuit 3 and the connection interrupting switch may be disposed onto the communication clock line 17 so as to halt the clock, and thus communications can also be stopped. Accordingly, connecting the capacitance detection circuit 3 for detecting wiring capacitance to the communication clock line 17 or both of the communication data line 16 and communication clock line 17 can also achieve similar operations, instead of connecting to the communication data line 16.

In the first place, when power is supplied to the programmable device 1 and nonvolatile device 2 from an external power source, Start Downloading Enable is turned on in order to start downloading configuration data, and then downloading the configuration data from the nonvolatile device 2 to the programmable device 1 is started. If any change in capacitance of the communication data line 16 is detected during the downloading, the capacitance detection circuit 3 causes the switch 24 to interrupt the communication data line 16, and thus the downloading is stopped. In this way, the circuit data can be protected from being read out.

It is possible for the circuit data to be read out from when Start Downloading Enable 4 is turned on and until when Finish Downloading Enable 5 is turned on. Finish Downloading Enable 5 remains off until the downloading is completed and the circuit is fixed. Once Finish Downloading Enable 5 is turned on, no communication is established between the programmable device 1 and the nonvolatile device 2, and thus it is impossible for the circuit data to be read out. That is, an output of the capacitance detection circuit 3 can be connected to Start Downloading Enable 4 or Finish Downloading Enable 5 and controlled so that Start Downloading Enable 4 is forced to be off or Finish Downloading Enable 5 is forced to be on causing the communications to stop, which has an effect equivalent to the effect of interrupting the connection via the communication data line 16 or communication clock line 17.

Now the following description is given focusing on the capacitance detection circuit 3, as the present invention is characterized in that the capacitance detection circuit is disposed on the communication wiring carrying configuration data.

Because a waveform observation apparatus, such as the oscilloscope 6, requires a probe, the capacitance detection circuit 3 is used for detecting input capacitance of the probe. As an example, a method for detecting a change in the rise time of a signal is described below.

FIG. 4 illustrates an example of the capacitance detection circuit 3. A method for detecting capacitance is described below with reference to FIGS. 4 and 9.

Figure 9:
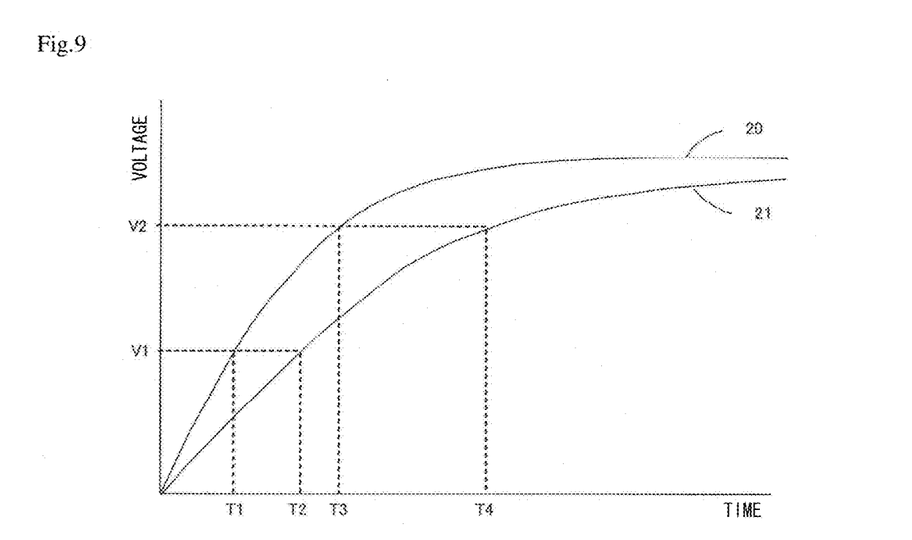
FIG. 9 illustrates enlarged waveforms at the rise time of the communication data line 16 for the control apparatus according to the second example of the present invention.

Parasitic capacitance exists around the communication wiring, for example between the GND line and the metal frame on a print circuit board. When the probe of a waveform observation apparatus or the like contacts with the wiring, electrostatic capacitance is generated between the probe and the wiring because the waveform observation apparatus is grounded. To detect this capacitance, two threshold voltages corresponding to the rise time of a signal and a threshold time representing detection accuracy for the MPU 18 are determined beforehand. FIG. 9 is an enlarged view of waveforms in the rise time of the communication data line 16. Any change in the capacitance on the communication data line 16 will delay the rise time due to an increase in the capacitance relative to the normal waveform 20 (such delayed waveform is hereinafter called capacitance loaded waveform 21). Now threshold values for the two comparators 19 are designated as V1 and V2, and their corresponding times for the normal waveform 20 are designated as T1, T3, and the corresponding times for the capacitance loaded waveform 21 are designated as T2, T4, respectively. If the waveform remains in the form of the normal waveform 20, T1 is equal to T2 and T3 is equal to T4. In the case of the capacitance loaded waveform 21, however, delays occur between T1 and T2 and between T3 and T4. Utilizing these delay times, that is, using the MPU to measure "T3–T1" and "T4–T2" makes it possible to determine whether capacitance is loaded on the line. A determination result provided by the MPU 18 will be output as a detection flag. The detection flag is directly connected to the switch 24 or the like that is used for interrupting the communication data line 16, thereby disconnecting the communication data line 16 to stop communications when capacitance is detected.

Figure 3:
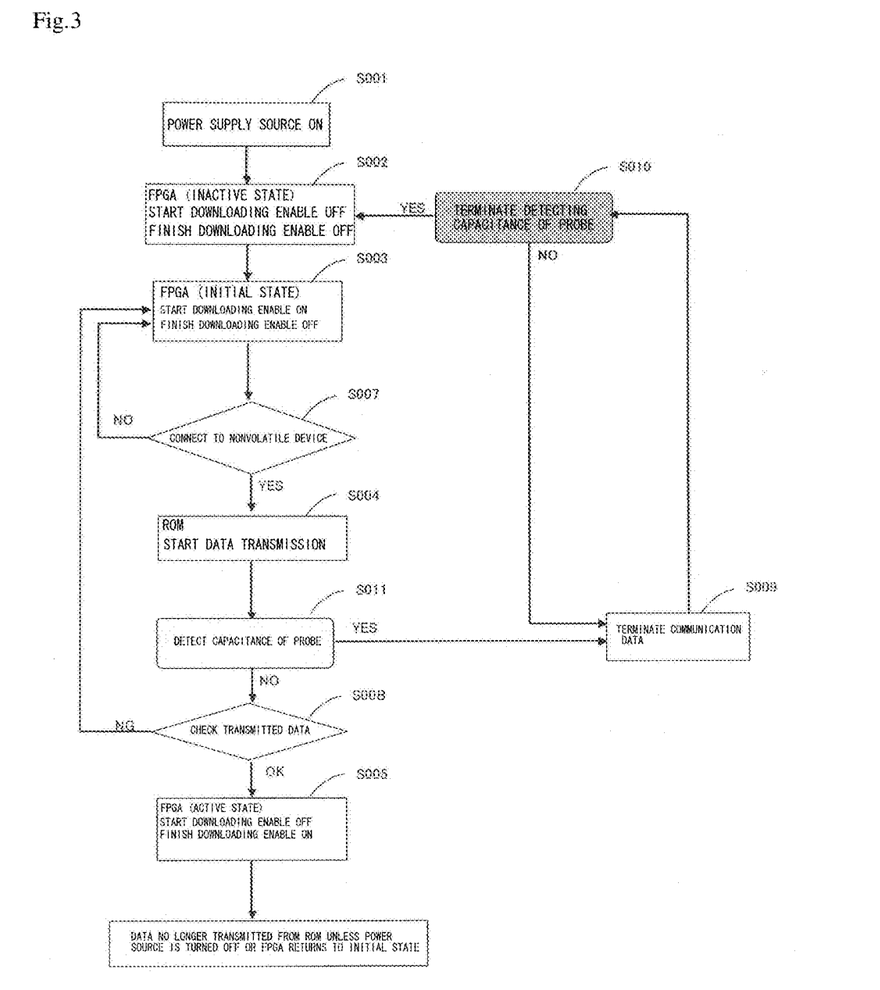
FIG. 3 illustrates a flowchart including detection of capacitance for a control apparatus according to a first example of the present invention.

FIG. 3 illustrates an example operational flowchart including detection of the probe capacitance for the control apparatus according to the present invention. The operations are described below.

After the power supply source is turned on (S001), the programmable device 1 is in an inactive state for a while (S002). The programmable device 1 transitions to an initial state by shifting Start Downloading Enable 4 to an on state (S003). The nonvolatile device 2 will start transmitting data upon receipt of the state of Start Downloading Enable 4 (S004), but the programmable device 1 may stop in the initial state (S003) depending on whether the nonvolatile device 2 is connected (S007). If a change in capacitance is detected on the communication data line 16 from when the nonvolatile device 2 starts transmitting data (S004) and until when the programmable device 1 checks the transmitted data (S008), the capacitance detection circuit 3 causes either the communication data line 16 or the communication clock line 17 to be inactivated (S009) and causes the programmable device 1 to transition to the inactive state (S002). As far as a change in capacitance of the communication data line 16 is still detected, the communication data line 16 remains in the inactive state (S009) and the programmable device 1 also remains inactive. It should be noted, however, just inactivating the communication data line 16 is effective without the programmable device 1 transitioning to the inactive state (S002); in this case, after the data transmission is resumed, the programmable device 1 determines the transmitted data to be NG and transitions to the initial state (S003). If no change in capacitance is detected on the communication data line 16, the programmable device 1 transitions to an active state (S005), and thereafter it is impossible for the circuit data to be read out because data transmission is prohibited, unless the power supply source is turned off or Start Downloading Enable 4 is caused to transition to the on state from outside.

Disposing a capacitance detection circuit as described above makes it possible to provide security, from the viewpoint of hardware, to such devices as the programmable device 1, which requires circuit data to be stored in the external nonvolatile device 2. In addition, much enhanced security can be provided in combination with conventional methods, such as a method for encrypting logic circuit data to disable recovery of the circuit or a method for assigning an ID code to prohibit reading data unless a matching ID code is given.

The present invention provides greater security than before by disposing a security system on the hardware.

Example 2

While the capacitance detection circuit described in the above example is mounted on a printed circuit board, security can be enhanced by an alternative way, for example, by providing a similar configuration within a programmable device or within an external device.

Figure 5:
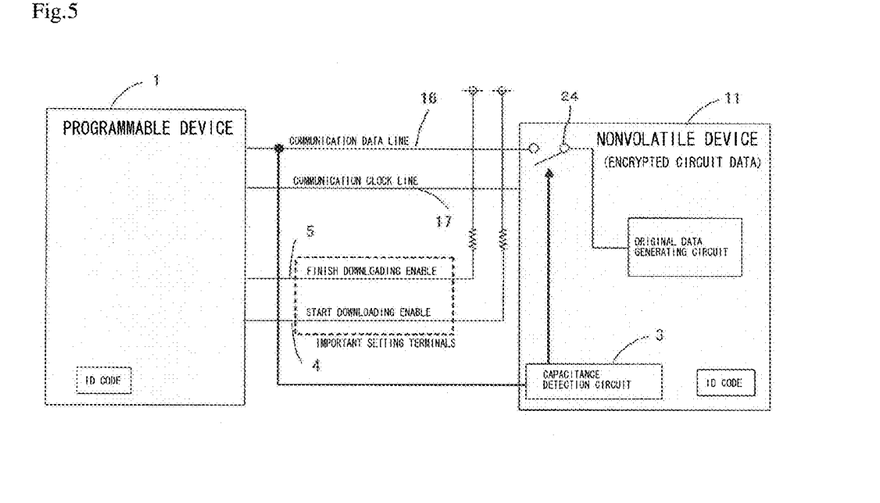
FIG. 5 illustrates a configuration of the control apparatus where the capacitance detection circuit and detection flag as well as a circuit for interrupting the communication data line are contained in the nonvolatile device, according to the first example of the present invention.
Figure 6:
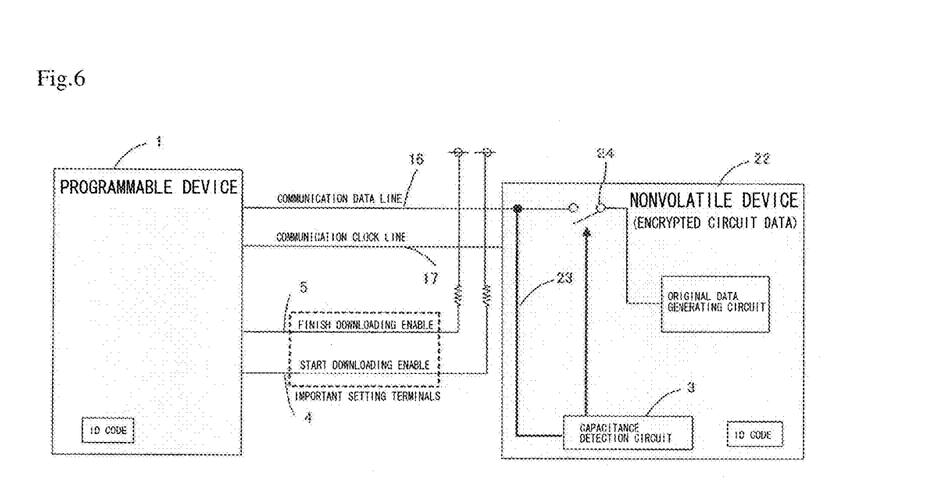
FIG. 6 illustrates a configuration of the control apparatus where the capacitance detection circuit and detection flag as well as a circuit for interrupting the communication data line and a detection line are contained in the nonvolatile device, according to a second example of the present invention.
Figure 7:
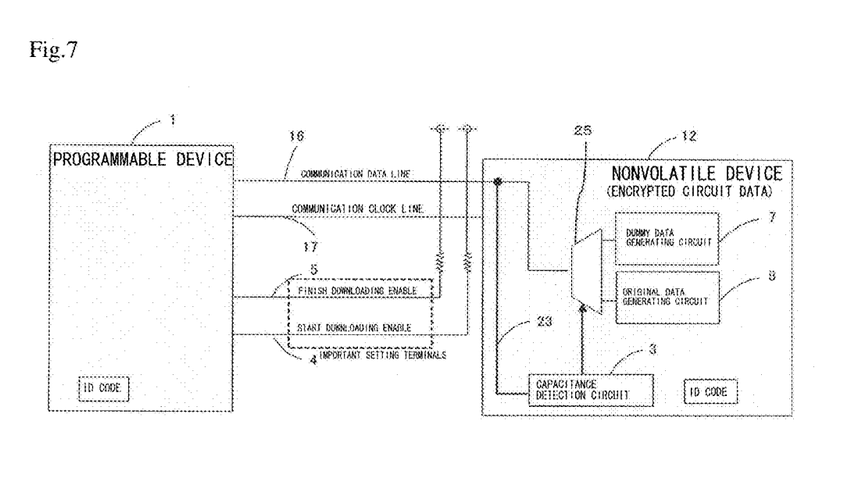
FIG. 7 illustrates a configuration of the control apparatus where the capacitance detection circuit and detection flag, a dummy data generating circuit, and a circuit for switching outputs between the original data generating circuit and dummy data generating circuit are contained in the nonvolatile device, according to the second example of the present invention.

FIGS. 5 to 7 illustrate example configurations where the capacitance detection circuit is included inside the nonvolatile device. Their descriptions are provided below.

Referring to FIG. 5, the capacitance detection circuit 3 as illustrated in FIG. 4 is included in the nonvolatile device 11. Containing the capacitance detection circuit 3 inside the nonvolatile device 11 makes it difficult to remove the capacitance detection circuit only.

Referring to FIG. 6, a detection line 23 used for detecting capacitance of the communication data line 16 is included inside the nonvolatile device 22. This configuration can prevent the capacitance detection circuit 3 from being disabled caused by breakage of the detection line 23 to ensure that the capacitance detection circuit 3 remains active. "Being disabled" as used herein refers to a state where a change in the rising edge as shown in FIG. 9 is not found due to breakage of the detection line 23 which is used for detecting capacitance, and consequently the capacitance detection circuit can no longer detect capacitance.

FIG. 7 shows that the capacitance detection circuit 3 as illustrated in FIG. 4 is included inside the nonvolatile device 12, and when any capacitance is detected, a switching device 25 switches output signals between the original data generating circuit 8 and the dummy data generating circuit 7. Accordingly, waveform observation will be performed on the dummy data and thus information about the original data can be protected. In addition, necessary data amount can be reduced if, for example, random data according to the data amount or validated parameters required for circuit operations are switched into dummy data.

Figure 8:
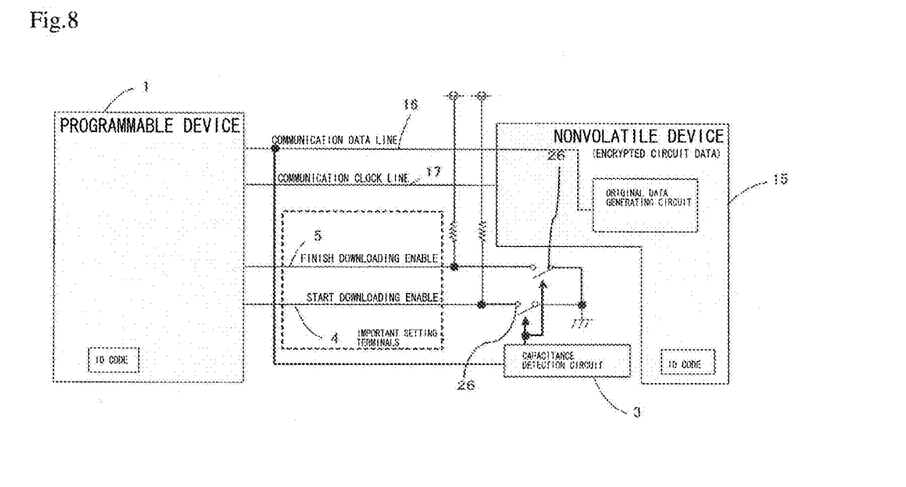
FIG. 8 illustrates a configuration of the control apparatus where the capacitance detection circuit is connected to important setting terminals, according to the second example of the present invention.

FIG. 8 illustrates an example configuration where the capacitance detection circuit is connected to the important setting terminals. When capacitance is detected by the capacitance detection circuit 3 as illustrated in FIG. 4, the switch 26 turns off either one or both of the two signals: Finish Downloading Enable 5 and Start Downloading Enable 4, which exist in the programmable device 1 as major important setting terminals, causing the programmable device 1 to stop, and thus communicated waveforms come to a halt. Alternatively, the capacitance detection circuit 3 may be contained in the nonvolatile device 15, like the nonvolatile devices 11, 22, and 12 illustrated in FIGS. 5, 6, and 7, respectively, if the nonvolatile device 15 includes in its inside either one or both of the signals: Finish Downloading Enable 5 and Start Downloading Enable 4, which are connected to the programmable device 1.

(Background of the Invention)

Recently, FPGAs and other similar devices of high versatility and requiring a shorter development period than application-specific integrated circuits (ASICs) have been increasingly produced and utilized. In spite of such advantages, these devices pose a risk of information leaks because it is possible for a third party to take out circuit or other data from the devices. The need for any reduction in such risk is very important.

(Possible Fields of Application of the Invention)

The present invention can be used for various circuit boards and display devices each of which is composed of a programmable device and an external device.

REFERENCE SIGNS LIST

1 Programmable device
2 Nonvolatile device
3 Capacitance detection circuit
4 Start Downloading Enable
5 Finish Downloading Enable
6 Oscilloscope
7 Dummy data generating circuit
8 Original data generating circuit
11 Nonvolatile device
12 Nonvolatile device
15 Nonvolatile device
16 Communication data line
17 Communication clock line
18 MPU
19 Comparator
20 Waveform
21 Capacitance loaded waveform
22 Nonvolatile device
23 Detection line
24, 26 Switch
25 Switching device

The invention claimed is:

1. A control apparatus, comprising:
a capacitance detection circuit disposed in circuitry, the circuitry comprising
a programmable device into which program data is configured to be written from outside to program a function, and
a nonvolatile device which holds the program data for the programmable device,
wherein the capacitance detection circuit detects capacitance of a communication line which connects the programmable device to the nonvolatile device.

2. The control apparatus according to claim 1, wherein a detection result from the capacitance detection circuit is connected to at least a line indicating completion of communication or a line indicating start of communication.

3. The control apparatus according to claim 1, wherein a detection result from the capacitance detection circuit is connected to at least a communication clock line or a communication data line.

4. The control apparatus according to claim 1, wherein a detection result from the capacitance detection circuit is connected to a circuit by which communication data is interrupted.

5. The control apparatus according to claim 3, wherein the detection result from the capacitance detection circuit is connected to the communication data line, whereby the communication data halts or the programmable device comes to an inactive state.

6. The control apparatus according to claim 4, wherein the detection result from the capacitance detection circuit is connected to the circuit which interrupts the communication data, whereby the communication data halts or the programmable device comes to an inactive state.

7. The control apparatus according to claim 1, wherein a detection result from the capacitance detection circuit is connected to a circuit which switches between dummy data and original data, whereby communication data is turned into data other than the original data.

8. The control apparatus according to claim 1, wherein a detection result from the capacitance detection circuit is connected to a circuit which switches between important setting terminals used for communication, whereby communication data halts or the programmable device comes to an inactive state.

* * * * *